United States Patent
Versluys et al.

(10) Patent No.: US 10,991,274 B2
(45) Date of Patent: *Apr. 27, 2021

(54) METHOD OF MAKING A CONTAINER HAVING A TAMPER EVIDENT FEATURE

(71) Applicant: SONOCO DEVELOPMENT, INC., Hartsville, SC (US)

(72) Inventors: Robert Thor Versluys, Florence, SC (US); Laura BuenAbad, Florence, SC (US)

(73) Assignee: Sonoco Development, Inc., Hartsville, SC (US)

(*) Notice: Subject to any disclaimer, the term of this patent is extended or adjusted under 35 U.S.C. 154(b) by 62 days.

This patent is subject to a terminal disclaimer.

(21) Appl. No.: 16/433,558

(22) Filed: Jun. 6, 2019

(65) Prior Publication Data

US 2019/0287430 A1 Sep. 19, 2019

Related U.S. Application Data

(63) Continuation of application No. 14/836,233, filed on Aug. 26, 2015, now Pat. No. 10,360,822.

(51) Int. Cl.
| | |
|---|---|
| *G09F 3/03* | (2006.01) |
| *G09F 3/00* | (2006.01) |
| *G09F 3/10* | (2006.01) |
| *G06K 19/06* | (2006.01) |
| *G09F 3/02* | (2006.01) |
| *B65B 61/20* | (2006.01) |

(52) U.S. Cl.
CPC ......... *G09F 3/03* (2013.01); *G06K 19/06009* (2013.01); *G06K 19/06037* (2013.01); *G09F 3/0291* (2013.01); *G09F 3/0292* (2013.01); *G09F 3/0297* (2013.01); *G09F 3/10* (2013.01); *B65B 61/202* (2013.01); *G09F 2003/0208* (2013.01); *G09F 2003/0213* (2013.01); *G09F 2003/0257* (2013.01); *G09F 2003/0272* (2013.01)

(58) Field of Classification Search
CPC ........ G06K 19/06009; G06K 19/06037; G09F 3/0291; G09F 3/0292; G09F 3/0297; G09F 3/10; G09F 2003/0213; G09F 2003/0208; G09F 2003/0257; G09F 2003/0272; B65B 61/202
USPC .......................................................... 53/410
See application file for complete search history.

(56) References Cited

U.S. PATENT DOCUMENTS

| | | | | |
|---|---|---|---|---|
| 4,505,399 A | * | 3/1985 | Weiner ............. | B65D 55/066 215/203 |
| 4,526,752 A | * | 7/1985 | Perlman ............ | B65D 55/026 116/207 |

(Continued)

FOREIGN PATENT DOCUMENTS

| | | | | |
|---|---|---|---|---|
| GB | 2243825 A | * | 11/1991 | ........... G09F 3/0292 |
| GB | 2243825 A | | 11/1991 | |

*Primary Examiner* — Chelsea E Stinson
*Assistant Examiner* — Mary C Hibbert-Copeland
(74) *Attorney, Agent, or Firm* — von Briesen & Roper, s.c.

(57) ABSTRACT

A method of making a container having a tamper evident feature. The method comprises affixing a tamper evident tag to a bottom end so that the tag covers perforations in the bottom end. The tag may be a film-based tag incorporating a color shifting ink layer. When the container is opened, air enters the interior of the container, passes through the perforations and activates the color shifting ink layer.

20 Claims, 5 Drawing Sheets

(56) References Cited

U.S. PATENT DOCUMENTS

| | | | | |
|---|---|---|---|---|
| 5,005,719 A | * | 4/1991 | Phillips | B65D 55/066 |
| | | | | 206/459.1 |
| 5,096,813 A | * | 3/1992 | Krumhar | B65D 55/026 |
| | | | | 422/401 |
| 2004/0050740 A1 | | 3/2004 | Lewis | |
| 2014/0339298 A1 | | 11/2014 | Lacoste et al. | |

* cited by examiner

METHOD OF MAKING A CONTAINER HAVING A TAMPER EVIDENT FEATURE

CROSS REFERENCE TO RELATED APPLICATION

This application is a continuation of U.S. application Ser. No. 14/836,233, filed Aug. 26, 2015. U.S. application Ser. No. 14/836,233 is incorporated here by reference in its entirety to provide continuity of disclosure.

BACKGROUND OF THE INVENTION

Field of the Invention

This invention patent relates to a tamper evident tag. More particularly, this invention relates to a tag incorporating a color shifting oxygen scavenger as a tamper evident feature.

Description of the Related Art

Tampering and pilferage of packaging is a significant problem. A potential problem is that someone will purchase a container of product, open the container and replace the product with a low-value product such as baking flour, and then return the can to the store for a refund. This can result in a loss of revenue and even the possibility that a subsequent purchaser of the container will receive an adulterated product.

The present invention is designed to address the problem described above.

BRIEF SUMMARY OF THE INVENTION

The present invention is a tamper evident tag is provided having a sealant layer, and ink layer and an oxygen barrier layer. The tag may be a film-based tag incorporating a color shifting ink layer located in the sealant layer and a bar code in the ink layer. The tag may be placed over one or more perforations in the bottom end covering of a container. When the container is opened, air enters the interior of the container, passes through the perforations and into the sealant layer. When the air reaches the color shifting ink layer it changes to a color the same as or similar to the bar code, rendering the bar code illegible.

In one embodiment the tag comprises a gas permeable sealant layer, an ink layer and a barrier layer. The sealant layer comprises a color shifting ink layer 34 embedded within one or more layers of sealant. The ink layer is interposed between the sealant layer and the oxygen barrier layer and comprises a machine readable code.

The color shifting ink layer may be made from an ink that is white before oxygen activation, and upon exposure to oxygen, turns a color the same as or similar to the color of the machine readable code, thus rendering the machine readable code unreadable.

The ink layer may further comprise a color shifting indicia. The color shifting indicia may be printed with an oxygen activated color shifting ink that forms a covert message when the indicia are exposed to air.

The ink layer may comprise black border that surrounds the color shifting ink layer to mask any edge effects of the color shift.

The oxygen barrier layer may be a coextruded web made at least in part from ethylene vinyl alcohol.

In another aspect, the disclosure relates to a tamper evident tag for a container, the container having a sealed top and a bottom end and defining an interior. The tag may comprise a gas permeable sealant layer, an ink layer and a barrier layer. The sealant layer has an inner facing surface adhered to the bottom end. The sealant layer comprises a color shifting ink layer embedded within one or more layers of sealant. The ink layer comprises a machine readable code and is located between the sealant layer and the barrier layer. The bottom end of the container defines one or more perforations that allow the interior of the container to communicate with the color shifting ink layer. Upon exposure to air the color shifting ink layer changes to a color that renders the bar code illegible by a bar code reading machine.

In another aspect the disclosure relates to a method of making a container having a tamper evident feature. The method comprises the steps of: providing a container defining an interior and having a top and a bottom end defining one or more perforations; filling the container with product and sealing the top of the container; providing a tamper evident tag according to the disclosure; affixing the tamper evident tag to the bottom end so that the tag covers the perforations and the interior communicates with the sealant layer; and activating the color shifting ink layer.

In another aspect the disclosure relates to a tamper evident tag comprising a sealant layer, an ink layer and a barrier layer. The sealant layer is adhered to the bottom end of a container and covers one or more perforations. The sealant layer defines one or more gaps that communicate with both the container interior and a color shifting indicia. The ink layer is interposed between the sealant layer and an oxygen barrier layer, and comprises color shifting indicia printed with oxygen activated color shifting ink. The color shifting indicia are configured to form a covert message that only appears when exposed to air.

DETAILED DESCRIPTION OF THE INVENTION

While the tamper evident tag may be embodied in many forms, there is shown in the drawings and will herein be described in detail one or more embodiments with the understanding that this disclosure is to be considered an exemplification of the principles of the tamper evident tag and is not intended to limit the scope of the claims to the illustrated embodiments.

Figure 1:
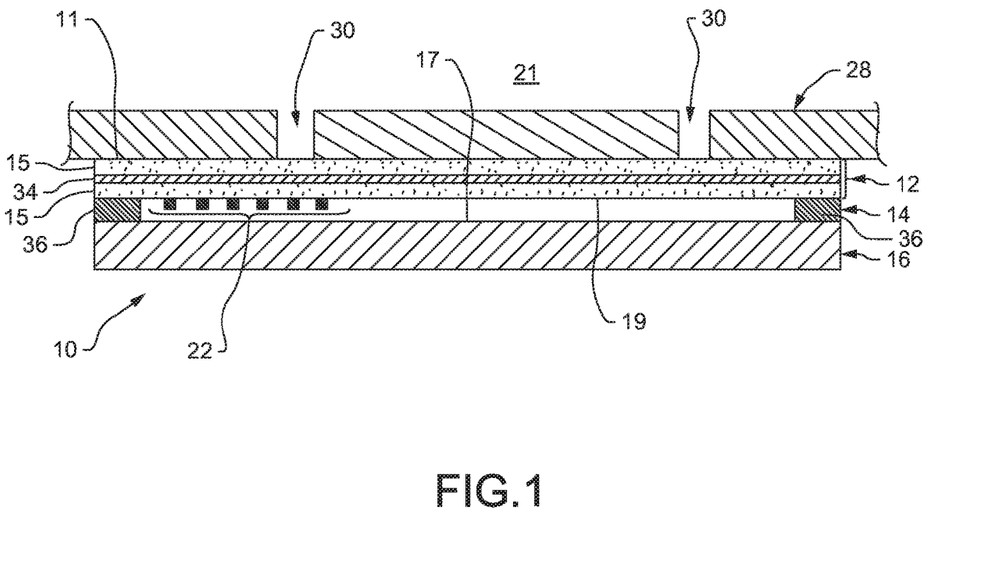
FIG. 1 is a cross-sectional view of a tag according to the disclosure affixed to a container.

Turning to the drawings, there is shown in FIG. 1 one embodiment of a tamper evident tag 10 according to the present disclosure. The tag 10 may be a film-based tag incorporating a color shifting oxygen scavenger ink as a tamper evident feature. The tag 10 may a have a construction similar to a membrane seal such as the Ultraseal® membranes commercially available from Sonoco Products Company and commonly used as an easy-opening cover for the top of a metal can. However, instead of covering the open top of a metal can, the tag 10 preferably is placed over one or more openings 30 on a metal end 28 covering a bottom 18 of a container 20.

Tag Construction

In one embodiment, the tag 10 comprises three layers: a sealant layer 12, an ink layer 14 and an oxygen barrier layer 16, as well as one or more color shifting components.

In the embodiment of FIG. 1, the sealant layer 12 comprises a color shifting ink layer 34 sandwiched between or embedded within one or more layers of sealant 15. The sealant 15 should adhere to the end 28 covering the bottom 18 of the container 20. The sealant layer 12 may be gas permeable, and should allow air from inside the container 20 and, more particularly, air passing through the perforations 30 in the container metal end 28, to reach the color shifting ink layer 34.

The color shifting ink layer 34 may be part of the sealant layer 12 as shown in FIG. 1, or it may be disposed between the sealant layer 12 and the barrier layer 16. The color shifting ink layer 34 is oxygen activated, that is, it is formed from an ink that, when exposed to air, reacts with the oxygen in the air to change color. Preferably the color shifting ink layer 34 is white before oxygen activation, and then upon exposure to air turns a color the same as or similar to the color of a machine readable code 22 located in the ink layer 14.

The ink layer 14 is disposed between the sealant layer 12 and the oxygen barrier layer 16 and may comprise a machine readable code 22 such as a UPC bar code. The ink layer 14 may also comprise color shifting indicia 38 (shown in FIG. 3). The ink layer 14 may be applied to the outer facing surface 19 of the sealant layer 12 as shown in FIG. 1 or to the inner facing surface 17 of the barrier layer 16. The machine readable code 22 may be printed with conventional ink (preferred) or with color shifting ink. The ink layer 14 may also comprise a black border 36 to mask any edge effects of a color shift caused by exposure of the ink layer to air.

The oxygen-barrier layer 16 preferably is clear or transparent film that prevents ambient oxygen from contacting the color shifting components of the tag 10, such as the color shifting ink layer 34 and, if present, the color shifting indicia 38, and initiating a color shift. The oxygen barrier layer 16 overlays the ink layer 14 to prevent ambient air from reaching the ink layer 14. The oxygen barrier layer 16 may be adhered to the black border 36 as shown in FIG. 1 and/or to the sealant layer 12. An ethylene vinyl alcohol (EVOH) coextruded web can be used as the oxygen barrier layer 16. If the oxygen barrier layer 16 of the tag 10 is in some way defective, air can reach the machine readable code 22 and render it unreadable. This ensures that product spoiled as a result of a defect in the oxygen barrier layer 16 does not reach customers.

Figures 2A, 2B:
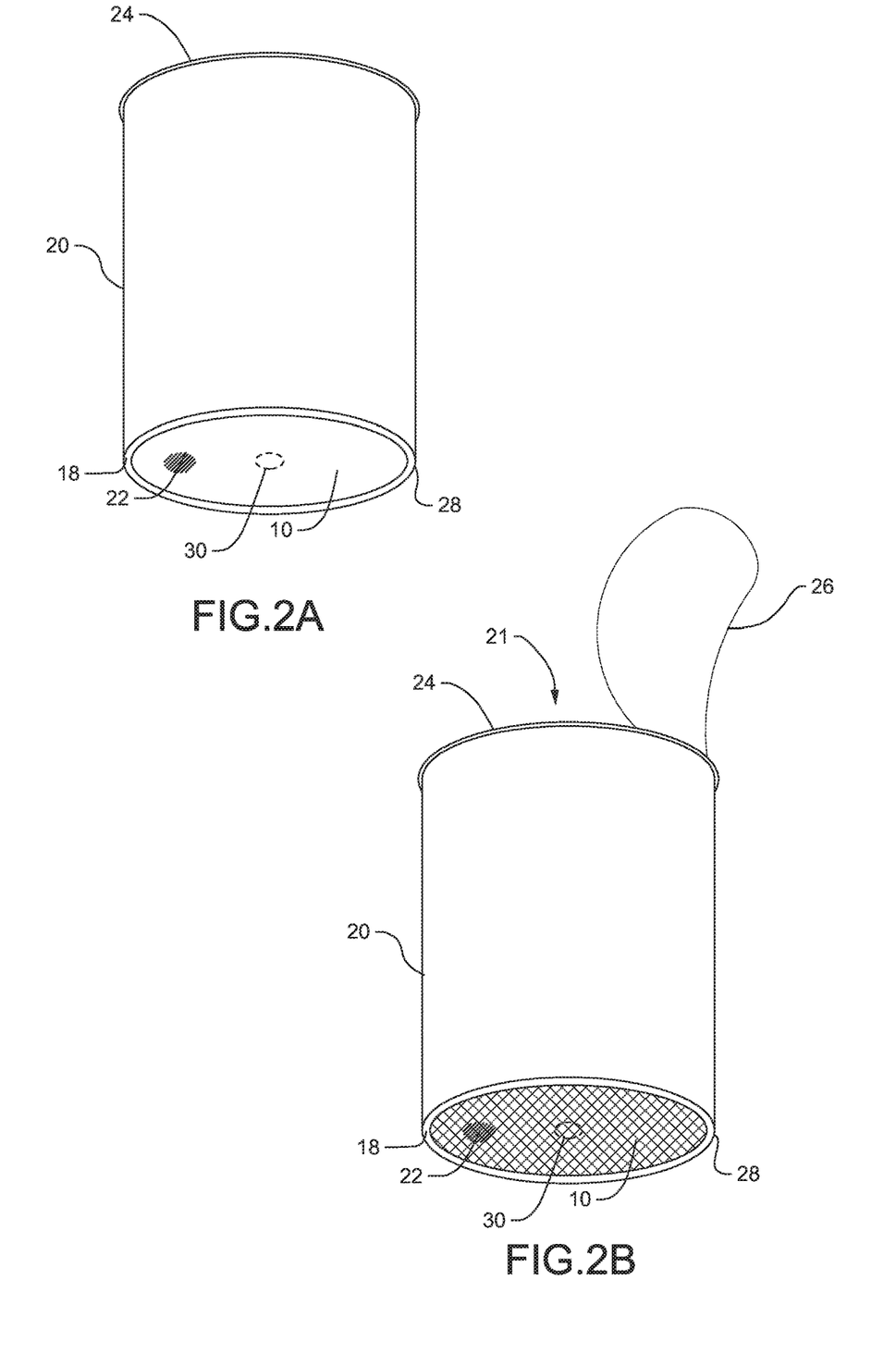
FIG. 2A is a perspective view of a container and the tag of FIG. 1 before the container has been opened.
FIG. 2B is a perspective view of a container and the tag of FIG. 1 after the container has been opened.

FIG. 2 is a bottom perspective view of a container 20 having a tamper evident tag 10 applied thereto. The container 20 may be a metal, plastic or composite can and may have a bottom 18 and a top 24. The top 24 may be sealed in any suitable fashion, including using a peelable membrane 26. The bottom 18 may be sealed in any suitable fashion, including using a rigid or semi-rigid metal end 28.

The tag 10 has a backside 11 (FIG. 1) that can be attached to the rigid metal end 28 of the container 20 where the bar code of a packaged product is commonly found. The tag 10 may be attached to the end 28 with adhesive, including permanent adhesive or pressure sensitive adhesive. As noted above, the tag 10 may carry the bar code 22 within the ink layer 14. The bar code 22 should be in a position available for scanning without the removal of a plastic overcap such as may be found on the top 24.

The end 28 defines one or more openings or perforations 30 to allow the interior 21 of the container 20 to communicate with the color shifting components of the tag 10. For example, the container end 28 shown in FIG. 2 defines series of perforations arranged in a circular pattern near the center of the end 28. Costs of construction may be reduced by using a full opening, but small perforations 30 may help with sagging and abuse resistance of the end 28. A small filter (not shown) may be affixed over the perforations 30 on either side of the end 28 for better control of the container contents.

Method of Attachment

FIG. 2A is a perspective view of a container 20 and the tag 10 of FIG. 1 before the container 20 has been opened. The tag 10 may be attached to the container 20 in any suitable fashion. For example, the tag 10 may be attached to the container 20 at a metal end manufacturing plant using a process similar to that used to attach Sonoco Product Company's Ultra-seal® membrane. Alternatively, the tag 10 may be attached to the container 20 using a pressure sensitive adhesive (PSA) (not shown in the drawings) as is sometimes used to attached gas release membrane valves to certain coffee packages.

The end 28 and tag 10 assembly may be attached to the container 20 at a winding plant. The tag 10 will be product specific due to the UPC code 22, requiring the product manufacturer to inventory the end 28 and tag 10 assembly specific to their products.

Activation/Package Filling

When the containers 20 are filled at a package filling facility, the packager may need to activate the oxygen scavenger in the color shifting ink components before or after filling, depending on if they are activating from the inside or the outside of the container 20. Activation from the outside is preferred, providing that the oxygen barrier layer 16 has sufficient UV transparency for external activation. It is desirable for the filling process to include modified atmosphere/nitrogen flushing to minimize the available oxygen inside the container 20.

Tamper Evident Functionality

When the container 20 is opened as shown in FIG. 2B, air enters the interior 21 of the container 20, passes through the perforations 30 and into the sealant layer 12. When the air reaches the color shifting ink layer 34, the color shifting ink layer 34 changes to a color preferably the same as or similar to the machine readable code 22. This renders the bar code 22 illegible, at least by a bar code reading machine. The effect should be irreversible and indicates that the container 20 has been opened. This functionality prevents someone from purchasing a container 20 of product, opening the container 20 and replacing the product with a lower-value product such as baking flour, and then returning the container 20 to the store for a refund.

The color contrast between the bar code 22 and the color shifting ink layer 34 is lost upon oxygen activation of the color shifting ink layer 34. For example, if the bar code 22 is printed with conventional ink, the bar code 22 may be rendered illegible when the color shifting ink layer 34 changes color, since the color shifting ink layer 34 is part of the visible background behind the bar code 22. The color shifting ink layer 34 may turn the same color as the bar code 22, or a different color that still renders the bar code 22 illegible. In FIG. 2B this color shift is indicated by cross-hatching of the tag 10.

If the bar code 22 is printed with color shifting ink, then both the bar code 22 and the color shifting ink layer 34 may change color, rendering the bar code 22 illegible. The color shifting ink layer 34 and the bar code 22 may turn the same color, such as brown or amber, or different colors.

If there is no color shifting ink layer 34, and the bar code 22 is printed with color shifting ink, then the bar code 22 may change to a color that renders it illegible, such as the background color of the sealant layer 12.

In summary, if the container 20 is emptied and the contents switched with another product, the bar code 22 is rendered illegible in one of the ways described above, preventing the bar code 22 from functioning. Nearly all stores require a functional (machine readable) UPC bar code in order to return products.

Alternative Embodiments

Figure 3:
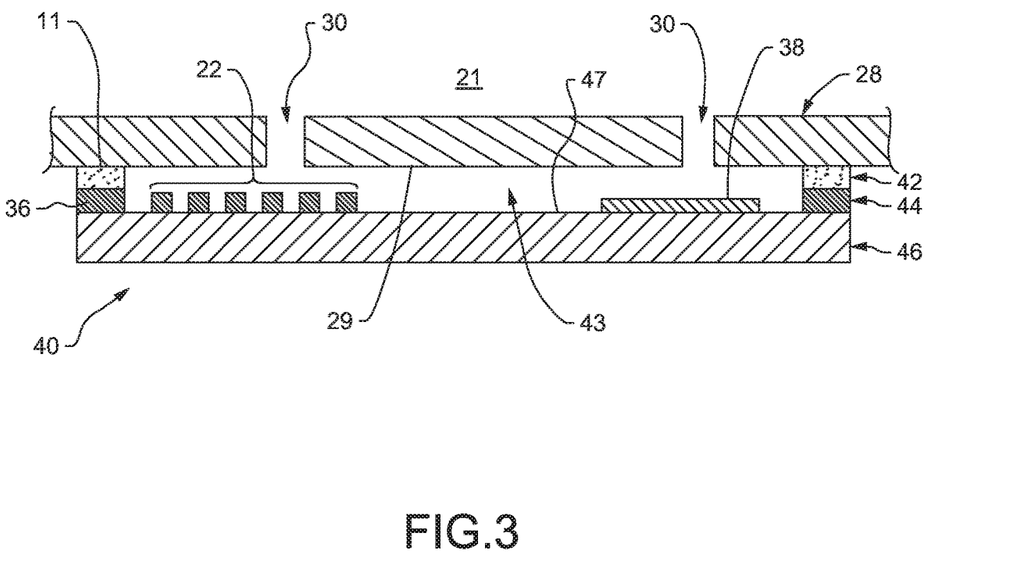
FIG. 3 is a cross-sectional view of an alternative tag according to the disclosure affixed to a container.

FIG. 3 is a cross-sectional view of an alternative tamper evident tag 40. The tag 40 may comprise three layers: a sealant layer 42, an ink layer 44 and an oxygen barrier layer 46.

The sealant layer 42 may comprise any suitable sealant material and is designed to adhere to an end 28 of a container 50. The sealant layer 42 is configured to allow air from inside the container 20 and, more particularly, air passing through the perforations 30 in the container end 28, to reach the color shifting components of the tag 40. Accordingly, the sealant layer 42 defines one or more gaps or spaces 43 that communicate with both the container interior 21 and the color shifting components. To achieve this, the sealant layer 42 may be a heat seal coating that is pattern applied to the container end 28 in such a way as to create one or more gaps 43 to allow air passing through the perforations 30 in the container end 28 to reach the color shifting components of the tag 40.

The intermediate ink layer 44 may comprise a machine readable code 22 and color shifting indicia 38, and may be applied to the inner facing surface 47 of the barrier layer 46 as shown in FIG. 3, or to the outer facing surface 29 of the end 28. In the illustrated embodiment the bar code 22 is printed with conventional ink, although it may be printed with color shifting ink. The color shifting indicia 38 is printed with oxygen activated color shifting ink, and may be a covert message that only appears when the indicia 38 is exposed to air. The ink layer 44 may also comprise a black border 36 to mask any edge effects of the oxygen scavenger/color shift.

The oxygen barrier layer 46 preferably is clear or transparent film and prevents ambient oxygen from contacting the color shifting indicia 38 and initiating a color shift.

Figure 4:
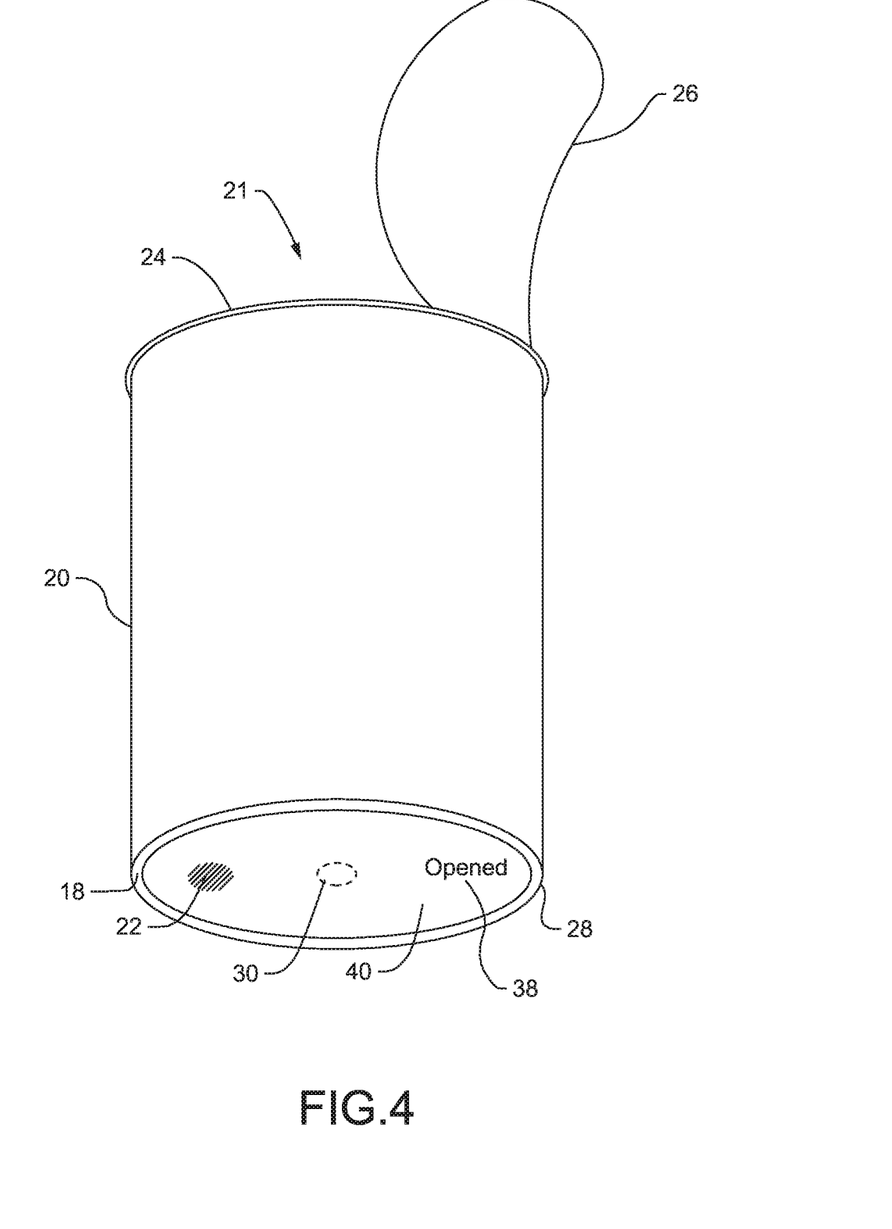
FIG. 4 is a perspective view of the container and tag of FIG. 3 after the container has been opened.

FIG. 4 is a bottom perspective view of an open container 20 having a tamper evident tag 40 according to this alternative embodiment. The rigid metal end 28 defines one or more perforations 30 to allow the interior 21 of the container 20 to communicate with the color shifting indicia 38. When the container 20 is opened as shown in FIG. 4, air passes through the interior 21 of the container 20. The covert message 38 will appear when the container 20 is opened. The message 38 can be any suitable message, such as the word "OPENED." As noted above, the color shifting indicia 38 can also be a part of the first embodiment tag 10 shown in FIGS. 1 and 2.

The color shifting indicia 38 also could be a Quick Response (QR) code that appears when the container 20 is opened. The QR Code could link to a website (also capturing some data about the can itself if a visible inkjet code was applied at the manufacturing and/or filling plant).

The UPC bar code 22 (or QR code 38) may be printed via inkjet, laser or similar device on the package filling line to prevent SKU proliferation in the warehouse and to address the issue of matching up container ends with container labels.

Figure 5:
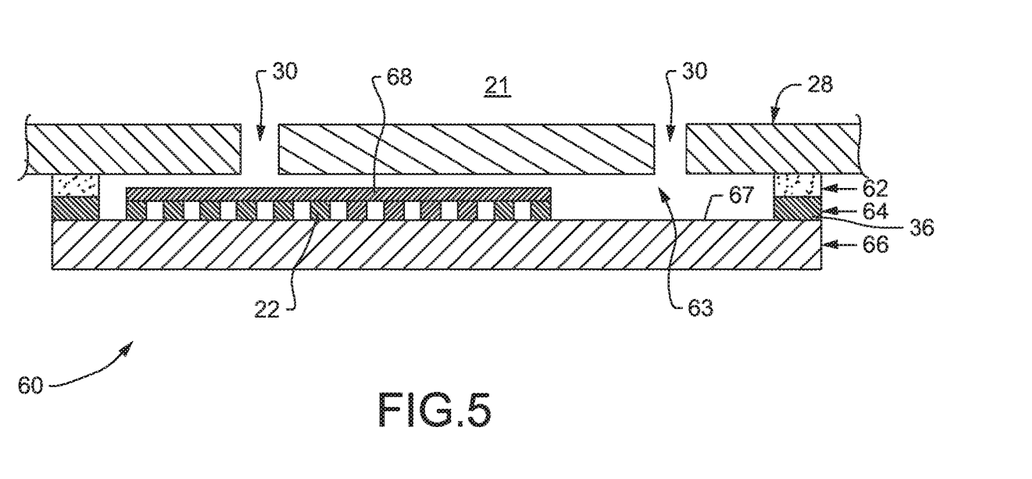
FIG. 5 is a cross-sectional view of an alternative tag according to the disclosure affixed to a container.

FIG. 5 is a cross-sectional view of another tag according to the disclosure affixed to a container. The tag 60 may comprise a sealant layer 62, an ink layer 64 and an oxygen barrier layer 66.

The sealant layer 62 may comprise any suitable sealant material and is designed to adhere to an end 28 of a container 50. The sealant layer 62 is configured to allow air from inside the container 20 and, more particularly, air passing through the perforations 30 in the container end 28, to reach the color shifting components of the tag 60. Accordingly, the sealant layer 62 defines one or more gaps or spaces 63 that communicate with both the container interior 21 and the color shifting components.

The intermediate ink layer 64 may comprise a machine readable code 22 and a color shifting ink layer 68 located behind the machine readable code 22 on the side away from the barrier layer 66. The machine readable code 22 may be applied to the inner facing surface 67 of the barrier layer 66. The color shifting ink layer 68 is printed with oxygen activated color shifting ink. The ink layer 64 may also comprise a black border 36 to mask any edge effects of the oxygen scavenger/color shift.

The oxygen barrier layer 66 preferably is clear or transparent film and prevents ambient oxygen from contacting the color shifting ink layer 68 and initiating a color shift.

When the container 20 is opened, air enters the interior 21 of the container 20, passes through the perforations 30 in the container bottom 28 and through the perforations or gaps 63 in the sealant layer 62. When the air reaches the color shifting ink layer 68, the color shifting ink layer 68 changes to a color preferably the same as or similar to the machine readable code 22, rendering the code 22 illegible, at least by a bar code reading machine.

Figure 6:
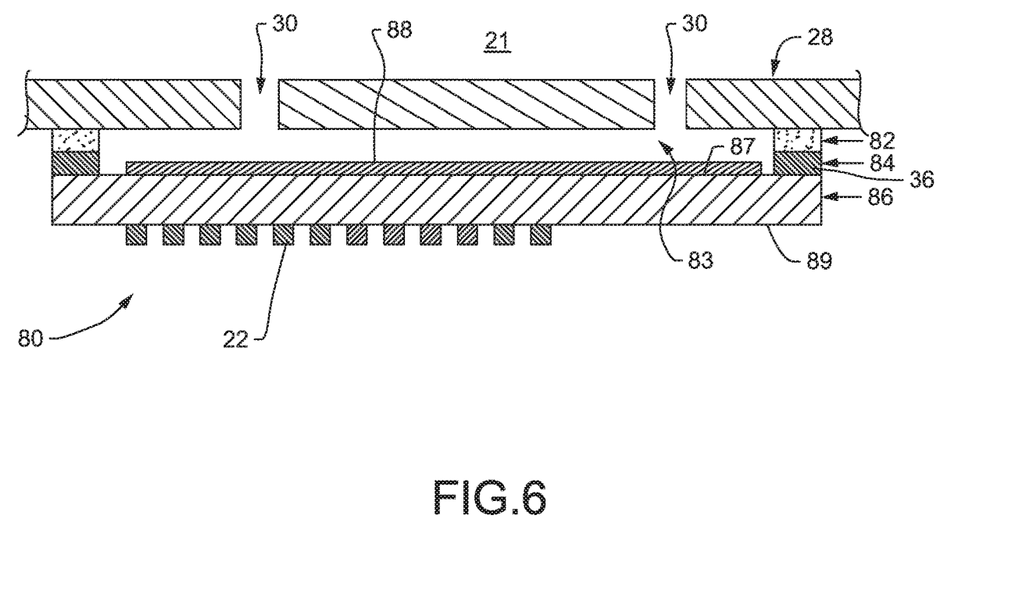
FIG. 6 is a cross-sectional view of an alternative tag according to the disclosure affixed to a container.

FIG. 6 is a cross-sectional view of another tag according to the disclosure affixed to a container. The tag 80 may comprise a sealant layer 82, an ink layer 84 and an oxygen barrier layer 86.

The sealant layer 82 may comprise any suitable sealant material and is designed to adhere to an end 28 of a container 50. The sealant layer 82 is configured to allow air from inside the container 20 and, more particularly, air passing through the perforations 30 in the container end 28, to reach the color shifting components of the tag 80. Accordingly, the sealant layer 82 defines one or more gaps or spaces 83 that communicate with both the container interior 21 and the color shifting components.

The intermediate ink layer 84 comprises a color shifting ink layer 88, preferably adhered to the inner facing surface 87 of the barrier layer 86. The color shifting ink layer 88 is printed with oxygen activated color shifting ink and is located at least in part behind the machine readable code 22. The ink layer 64 may also comprise a black border 36 to mask any edge effects of the oxygen scavenger/color shift.

The oxygen barrier layer 86 preferably is clear or transparent film and prevents ambient oxygen from contacting the color shifting ink layer 88 and initiating a color shift.

The machine readable code 22 may be applied to an area of the outer facing surface 89 of the barrier layer 86 above the color shifting ink layer 88 either immediately before or even during the filling of the container 20. This has the advantage of allowing all of the containers or container ends to be the same until it is time to add product, thus preventing a build-up in inventory of any particular bar coded (pre-printed) container.

When the container 20 is opened, air enters the interior 21 of the container 20 and passes through the perforations 30 in the bottom 28 and through the perforations or gaps 83 in the sealant layer 82. When the air reaches the color shifting ink layer 88, the color shifting ink layer 88 changes to a color preferably the same as or similar to the machine readable code 22, rendering the code 22 illegible, at least by a bar code reading machine.

Method of Making a Container with a Tamper Evident Feature

In another aspect of the disclosure, a method of making a container 20 having a tamper evident feature is provided. The method may comprise the steps of providing a container 20 defining an interior 21 and having a sealed top 24 and a bottom end 28, the bottom end 28 defining one or more perforations 30;

filling the container 20 with product and sealing the top of the container 20;

providing a tamper evident tag 10 comprising a gas permeable sealant layer 12, an ink layer 14 and a barrier layer 16, the sealant layer 12 comprising a color shifting ink layer 34 embedded within one or more layers of sealant 15, the ink layer 14 comprising a machine readable code 22 and located between the sealant layer 12 and the oxygen barrier layer 16;

affixing the tamper evident tag 10 to the bottom end 28 so that the tag 10 covers the perforations 30 and the interior 21 communicates with the sealant layer 12; and activating the color shifting ink layer 34.

The activating step may include activating the color shifting ink layer 34 from the inside or outside of the container 20. The method may include, after the filling step, the step of flushing the interior to minimize the presence of available oxygen within the container 20.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A method of making a container having a tamper evident feature, the method comprising the steps of:
providing a container sidewall defining an interior and having a top and a bottom;
sealing the bottom with a metal bottom end, the metal bottom end defining one or more perforations;
filling the container with product;
sealing the top of the container;
providing a tamper evident tag comprising a gas permeable sealant layer, an ink layer and a barrier layer, the gas permeable sealant layer comprising a color shifting ink layer embedded within one or more layers of sealant, the ink layer comprising a machine readable code and located between the sealant layer and the oxygen barrier layer, the one or more layers of sealant configured to allow air from the interior of the container to reach the color shifting ink layer;
affixing the tamper evident tag to the metal bottom end so that the tag covers the perforations and the sealant layer communicates with the interior; and
activating the color shifting ink layer.

2. The method of claim 1 wherein:
the activating step includes activating the color shifting ink layer from the outside of the container.

3. The method of claim 1 including, after the filling step, the step of:
flushing the interior to minimize the presence of available oxygen within the container.

4. The method of claim 1 wherein:
sealing the top of the container comprises sealing the top with a peelable membrane.

5. The method of claim 1 wherein:
the affixing step includes affixing the tag to the bottom end with a pressure sensitive adhesive.

6. A method of making a container having a tamper evident feature, the method comprising the steps of:
providing a container sidewall defining an interior and having a top and a bottom;
sealing the bottom with a metal bottom end, the metal bottom end defining one or more perforations;
filling the container with product;
sealing the top of the container;
providing a tamper evident tag comprising a sealant layer, an oxygen barrier layer and an ink layer interposed therebetween, the ink layer comprising a color shifting indicia, the oxygen barrier layer overlaying the ink layer, the sealant layer configured to allow air from the interior of the container to reach the ink layer;
affixing the tamper evident tag to an outer surface of the metal bottom end so that the sealant layer covers the perforations and the color shifting indicia communicates with the interior; and
activating the color shifting ink.

7. The method of claim 6 wherein:
the activating step includes activating the color shifting ink from the outside of the container.

8. The method of claim 6 including, after the filling step, the step of:
flushing the interior to minimize the presence of available oxygen within the container.

9. The method of claim 6 wherein:
sealing the top of the container comprises sealing the top with a peelable membrane.

10. The method of claim 6 wherein:
the affixing step includes affixing the tag to the bottom end with a pressure sensitive adhesive.

11. The method of claim 6 wherein:
the tag further comprises a machine readable code applied to an outer facing surface of the oxygen barrier layer in an area above at least a portion of the color shifting ink layer.

12. The method of claim 6 wherein:
the color shifting ink is adhered to an inner facing surface of the oxygen barrier layer.

13. The method of claim 6 comprising the additional step of:
printing the color shifting indicia with oxygen activated color shifting ink configured to form a covert message that only appears when the color shifting indicia is exposed to air.

14. The method of claim 6 comprising the additional step of:
affixing a filter over the perforations.

15. A method of making a container having a tamper evident feature, the method comprising the steps of:
providing a container sidewall defining an interior and having a top and a bottom;
sealing the bottom with a bottom end, the bottom end defining one or more perforations;
filling the container with product;
sealing the top of the container;

providing a tamper evident tag comprising a gas permeable sealant layer, an oxygen barrier layer and an ink layer interposed therebetween, the gas permeable sealant layer defining one or more gaps that communicate with the ink layer, the ink layer comprising a machine readable code and an oxygen activated color shifting ink layer located behind the machine readable code on a side of the machine readable code away from the oxygen barrier layer, the gas permeable sealant layer configured to allow air from the interior of the container to reach the color shifting ink layer;

affixing the tamper evident tag to the bottom end so that the tag covers the perforations and the interior communicates with the color shifting ink layer; and activating the color shifting ink layer.

16. The method of claim 15 wherein:

the activating step includes activating the color shifting ink from the outside of the container.

17. The method of claim 15 including, after the filling step, the step of:

flushing the interior to minimize the presence of available oxygen within the container.

18. The method of claim 15 wherein:

sealing the top of the container comprises sealing the top with a peelable membrane.

19. The method of claim 15 wherein:

the bottom end comprises metal.

20. The method of claim 15 wherein:

the affixing step includes affixing the tag to the bottom end with a pressure sensitive adhesive.

* * * * *